United States Patent [19]

Malinsky et al.

[11] Patent Number: 4,553,035

[45] Date of Patent: Nov. 12, 1985

[54] DATA ACQUISITION CONTROL METHOD AND SYSTEM FOR A HAND HELD READER

[75] Inventors: Igor Malinsky, N. Miami Beach; Jose B. Cofino; Richard J. McKay, both of Miami, all of Fla.

[73] Assignee: Mylex Corporation, Hialeah Garden, Fla.

[21] Appl. No.: 527,811

[22] Filed: Aug. 30, 1983

[51] Int. Cl.⁴ .............................................. G06K 7/10
[52] U.S. Cl. ................................. 250/566; 235/472; 382/59
[58] Field of Search .................. 382/59, 13, 11; 235/472, 466; 250/237 G, 566, 568, 569; 340/347 P

[56] References Cited

U.S. PATENT DOCUMENTS

| | | | |
|---|---|---|---|
| 3,238,501 | 3/1966 | Mak et al. | 235/472 |
| 3,410,991 | 11/1968 | Van Berkel | 382/11 |
| 3,731,276 | 5/1973 | Rayfield | 382/11 |
| 3,735,350 | 5/1973 | Lemelson | 340/146.3 SY |
| 3,790,756 | 2/1974 | Graves et al. | 235/466 |
| 3,859,632 | 1/1975 | Etter | 235/472 |
| 3,918,029 | 11/1975 | Lemelson | 340/146.3 SY |
| 3,947,817 | 3/1976 | Requa | 250/566 |
| 3,991,299 | 11/1976 | Chadima, Jr. | 250/555 |
| 4,114,035 | 9/1978 | Herzog | 250/237 G |
| 4,377,741 | 3/1983 | Brekka et al. | 235/472 |
| 4,465,373 | 8/1984 | Tamaki et al. | 340/347 P |

*Primary Examiner*—David C. Nelms
*Attorney, Agent, or Firm*—Cushman, Darby & Cushman

[57] ABSTRACT

For controlling the acquisition of data in an optical character recognition system having a head for scanning characters, a guide is provided to be disposed along the series of characters. A rail on the guide cooperates with a groove in the head to guide the head along the characters. Disposed on the guide is a reticle having a saw-toothed pattern with segments at 45° with respect to the rail. A linear sensor array, attached to the head normal to the groove monitors the position of points of the reticle normal to the track. This normal position is then translated to the position of the head. Every time the head moves a predetermined distance, it is caused to output data relating to the series of characters. The invention can also be employed to monitor position in any system having an element that moves along a path.

17 Claims, 4 Drawing Figures

DATA ACQUISITION CONTROL METHOD AND SYSTEM FOR A HAND HELD READER

BACKGROUND OF THE INVENTION

1. Field of the Invention

The present invention relates to position determining techniques which may be used advantageously in optical character recognition systems, and more particularly in such systems which are portable.

2. Description of the Prior Art

The need for and popularity of optical character recognition systems has recently grown enormously due to the tremendous popularity of word processing systems and the like which may employ an optical character reader to input data into the system. In these applications, it has been traditional to employ large mechanical structures for controlling the head that actually scans the characters and converts the optical data into an electrical signal. These automatic scanning structures are able to control the alignment of the sheet being read with the scanning head and also the speed at which the head scans.

The size and complexity of such automatic mechanical scanning structures render them inappropriate for numerous applications in which portability is desirable. To enhance portability, those working in this field have attempted to eliminate the necessity for the large mechanical scanning structure. Thus, U.S. Pat. No. 3,991,299 to Chadima, Jr., et al teaches a bar code scanner in which a pen-shaped instrument is drawn across the bar code in order to read it.

Others have even attempted to develop hand-held readers for codes other than bar codes. Thus, U.S. Pat. No. 4,377,741 to Brekka et al teaches a hand-held optical code reader. However, when advancing from relatively simple bar code readers to more general character scanners, problems arise with respect to alignment of the scanning head with respect to the characters and the speed with which the scanning head proceeds over the characters. Lacking the mechanical structure for controlling these variables, a portable unit must employ alternative solutions to minimize problems associated with alignment or skew and spacing.

U.S. Pat. Nos. 3,918,029 and 3,735,350, both to Lemelson, teach a scanning system which provides a solution to the alignment or skew problem. A guide is provided for directing a scanning element across a row of characters. Thus, prior to scanning, the characters are aligned with the guide. Then, it becomes fairly simple to maintain alignment of the scanning head with the row of characters by sliding the head along the guide. However, even in these patents, codes and not characters are being scanned. A problem may be that although skew errors have been removed, it is still necessary to recognize the scanned characters. If the speed of scanning varies or even is different from a pre-established ideal speed, the proportions of characters that have been read and converted into electrical signals will vary, thus rendering the problem of recognition extremely difficult.

U.S. Pat. No. 3,947,817 to Requa, which teaches a portable, hand-held optical code reader, mentions the problem that variations in scanning speed, producing expansions and contraction of data, render recognition difficult. However, the solution suggested in this patent involves fairly complicated data processing.

SUMMARY OF THE INVENTION

The present invention solves the variable speed problem by providing apparatus and method for determining the position of an element by reading a reticle at a position related to the position of the element. The preferred embodiment is directed to monitoring the position of the head in an optical code recognition system. By monitoring the position of the head with the reticle, data can be output every time the head has moved a predetermined distance, thus rendering uniform data collected in the direction of the scan.

One aspect of the invention is that the reticle has a portion transverse to the direction in which the reticle is read. In the preferred embodiment, the reticle has a saw-toothed pattern having sections lying at an angle of 45° with respect to the direction of scanning. The position along the reticle is then determined by monitoring the position of points of the reticle normal to the scanning direction. This normal position can then be translated into the position of a corresponding element along its path. In this regard, it is particularly advantageous if the sensing element for the reticle is a linear array sensor.

One problem with prior scanners is their criteria for determining between white and black areas. A novel automatic gain control circuit is employed in the present invention which integrates the output of the sensor. Then, the output of the integrator is compared with the data from the sensor to generate a digital indication of the data which operates independently of the level of illumination and the sensitivity of the array sensor.

In the preferred embodiment, the reticle is disposed on a base. Also attached to the base is a track, in the form of a rail. A follower, associated with the scanning head and in the form of a groove, rides along the track. Therefore, to overcome both the alignment problem and the speed problem, the base is aligned with the line of characters to be read and the head is moved along the track.

Although the preferred embodiment of the present invention, as will be described herein, relates to controlling the acquisition of data in an optical character recognition system, the present invention has utility for determining the position of any object which moves along a path. Such applications would include machine tool control, monitoring the position of robot arms and monitoring the position of radially slidable heads for reading magnetic disks, in addition to many others.

BRIEF DESCRIPTION OF THE DRAWING

These and other objects and advantages of the invention will become more apparent and more readily appreciated from the following detailed description of the presently preferred exemplary embodiment of the invention taken in conjunction with the accompanying drawing, of which.

DETAILED DESCRIPTION OF THE PRESENTLY PREFERRED EXEMPLARY EMBODIMENT

Figure 1:
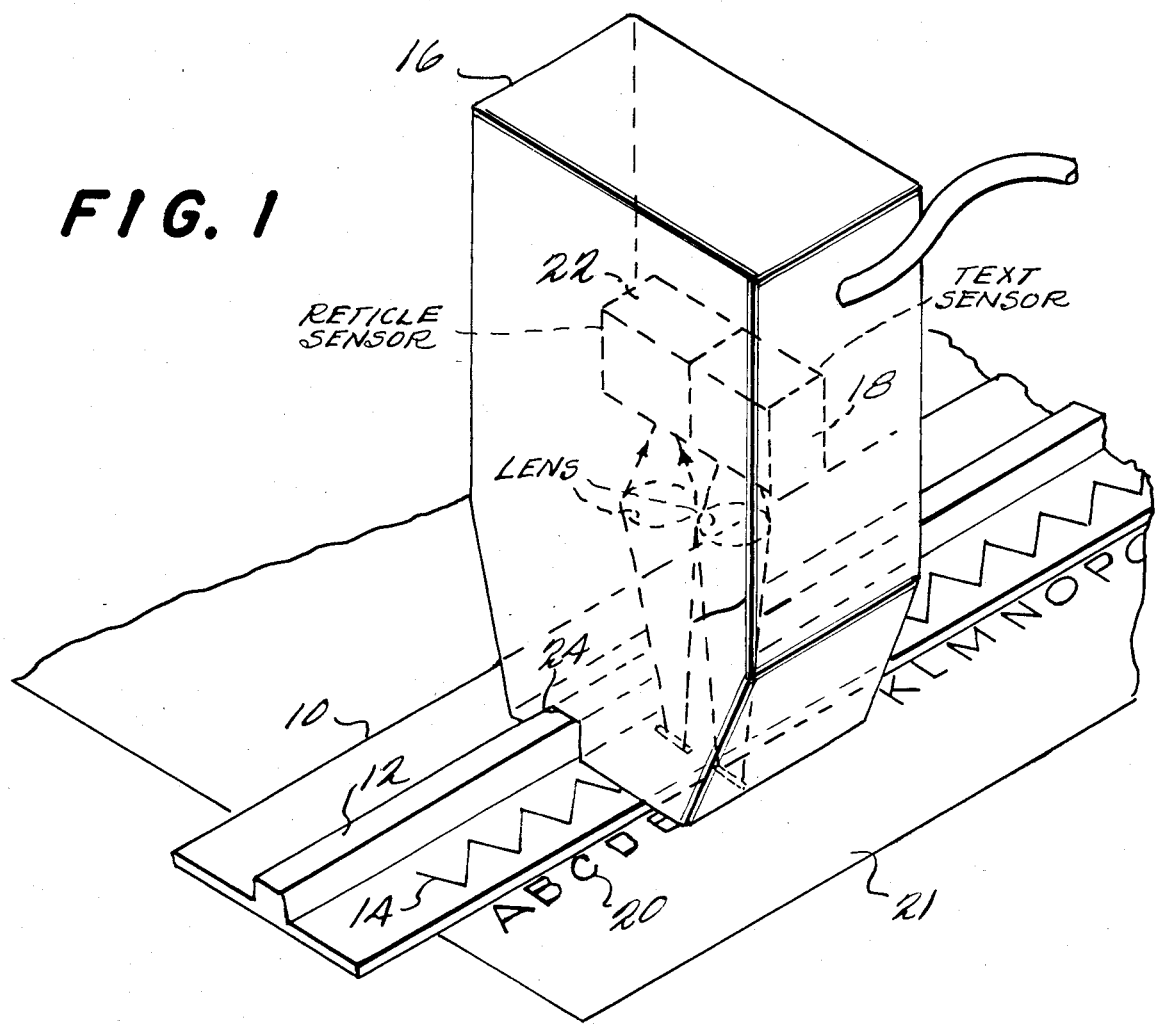
FIG. 1 is a schematic perspective of the system of the present invention.

The overall system of the present invention, as illustrated in FIG. 1, includes a base 10, which may be similar to a flexible plastic ruler. Disposed on base 10 is a track, such as rail 12. Embedded in base 10 is reticle 14. In the preferred embodiment, reticle 14 has a saw-toothed pattern with segments lying at a 45° angle with respect to track 12.

Head 16 includes text sensor 18, such as an array charge coupled device, for reading characters 20 on sheet 21. Also included in head 16 is sensor 22 for reading reticle 14. In the preferred embodiment, sensor 22 is a linear sensor array of charge coupled devices, photodiodes, or the like. In fact, the CCD112 linear sensor array manufactured by Fairchild or the G-series linear sensor array manufactured by Reticon are perfectly suitable for the present invention. Defined by head 16 is a follower, such as groove 24, dimensioned to cooperate with rail 12.

In operation, base 10 is aligned with characters 20 and head 16 is positioned so that rail 12 extends into groove 24. Then, head 16 is slid along base 10. Every time head 16 has moved a predetermined distance as determined by reticle sensor 22 monitoring reticle 14, character sensor 18 outputs a signal representing characters it is reading.

Figure 2:
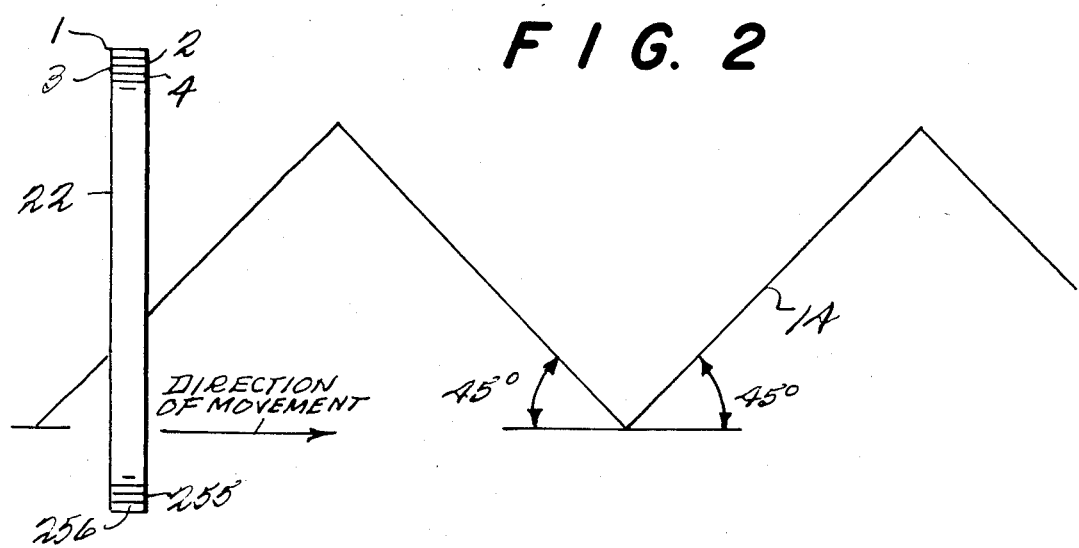
FIG. 2 is a schematic illustration useful in explaining the manner of operation of the present invention.

The manner in which sensor 22 monitors position with respect to reticle 14 is illustrated in FIG. 2. In the preferred embodiment, reticle sensor 22 includes 256 sensing cells linearly arranged in a direction normal to the extent of rail 12. As head 16 slides along rail 12, the image of reticle 14 impinges on different cells of sensor 22. The particular cell which receives the image of reticle 14 is a direct indication of the position of the head. In the preferred embodiment, the segments of reticle 14, having a saw-toothed pattern, form a 45° angle with respect to the direction of movement of head 16. Therefore, if the particular cell of sensor 22 which receives the image of reticle 14 changes, head 16 has moved a distance exactly equal to the distance between the cells. In the preferred embodiment, when the position at which the image of reticle 14 crosses sensor 22 changes by a predetermined number of cells, then circuitry causes text sensor 18 to output data. In this manner, the distance between readings by text sensor 18 remains constant, independent of the speed at which head 16 is moved.

Figure 3:
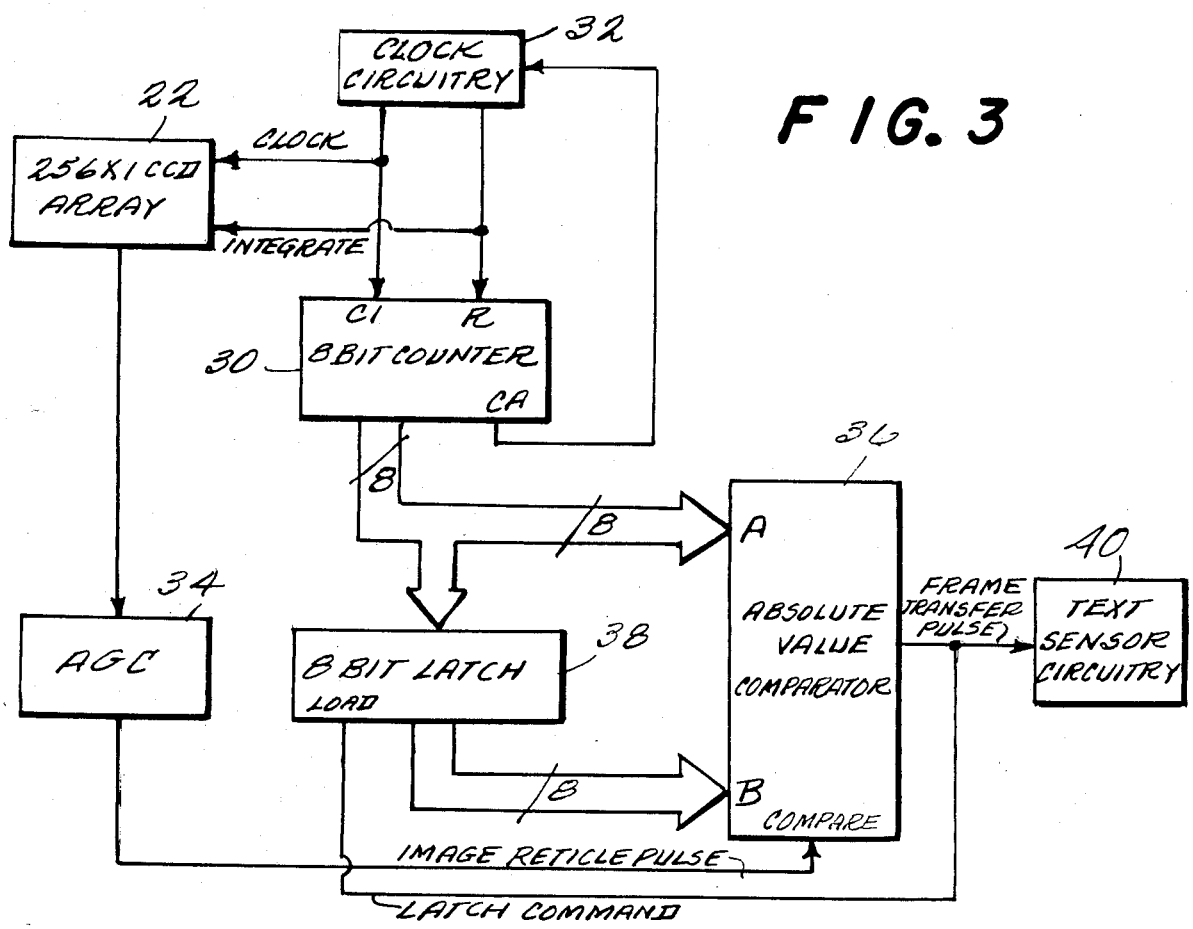
FIG. 3 is a block diagram of the electronics of the present invention.

The circuitry for processing data from sensor 22 to determine when text sensor 18 should output data is illustrated in FIG. 3. As indicated above, in the preferred embodiment, sensor 22 includes 256 cells. Counter 30 has an 8-bit output which is also able to count up to 256. When data is being read out of sensor 22, counter 30 is incremented so that the output of counter 30 exactly represents the cell in sensor 22 from which data is being output. The outputting of data from sensor 22 and the incrementing of counter 30 is controlled by clock circuitry 32 which includes the well-known circuitry necessary to control and operate a linear sensor array.

The serial, analog video data of sensor 22 is applied to automatic gain control circuit 34. This circuit produces a pulse every time the reticle image is detected. This pulse is applied to comparator 36 to initiate a comparison. Comparator 36 compares the output of counter 30 and the output of latch 38. When the absolute value of the difference between the two inputs is greater than or equal to a predetermined value, 2 in the preferred embodiment, comparator 36 produces an output which is applied not only to circuitry 40 for causing text sensor 18 to output data, but also to a load input of latch 38.

In operation, as clock circuitry 32 begins producing clock pulses, data is sequentially read out of cells in sensor 22 and, at the same time, counter 30 is incremented. Each element of data is applied to automatic gain control circuit 34. Most of the data applied to circuit 34 corresponds to the image of the background for reticle 14. Therefore, no output pulse is produced. However, eventually, circuit 34 detects the reticle image and produces an output pulse which is applied to comparator 36. At this time, counter 30 stores a count related to the cell of sensor 22 which detected the reticle image. For example, if cell 64 detects the reticle image, then the count in counter 30 will be 64. Since this is the first time that a comparison is being made, latch 38 is empty, so that the comparison of the outputs of counter 30 and latch 38 results in an absolute value difference greater than the predetermined value. Therefore, comparator 36 produces an output pulse which causes text sensor circuitry 40 to output data from text sensor 18. At the same time, a pulse is applied to the load input terminal of latch 38 to cause it to store the count in counter 30.

Clock circuitry 32 continues to serially output data from sensor 22 and increment counter 30 until the last cell of sensor 22 is output. With this, counter 30 reaches a count of 256 which causes a carry output of counter 30 to generate a signal which is applied to clock circuitry 32. In response to this signal, clock circuitry 32 produces a signal which resets counter 30 and causes the optical detectors in sensor 22 to integrate the amount of light being received so as to generate the next set of data. Thereafter, clock circuitry 32 again causes sensor 22 to serially output data while counter 30 is incremented.

A cell in sensor 22 will again store the image of reticle 14. When AGC circuit 34 senses this image, it produces a pulse which causes comparator 36 to perform a comparison. At this time, latch 38 stores an indication of the cell of sensor 22 which stored the image of reticle 14 in the previous measurement cycle. Counter 30 stores an indication of the cell of sensor 22 which contains the image of reticle 14 in the present measurement cycle. If head 16 has not moved, these indications should be the same so that comparator 36 will not produce an output. Therefore, circuitry 40 will not cause text sensor 18 to output data and latch 38 will not be reloaded.

This process continues until head 16 has moved so that the cell receiving the reticle image changes by the predetermined number. Then, when comparator 36 compares the output of counter 30 with the output of latch 38, an output pulse will be generated which causes text sensor 18 to output data and latch 38 to be loaded with the count stored in counter 30.

In this manner, text sensor 18 outputs data every time head 16 has traveled a predetermined distance. In the preferred embodiment, this distance corresponds to 2 cell widths of sensor array 22.

Figure 4:
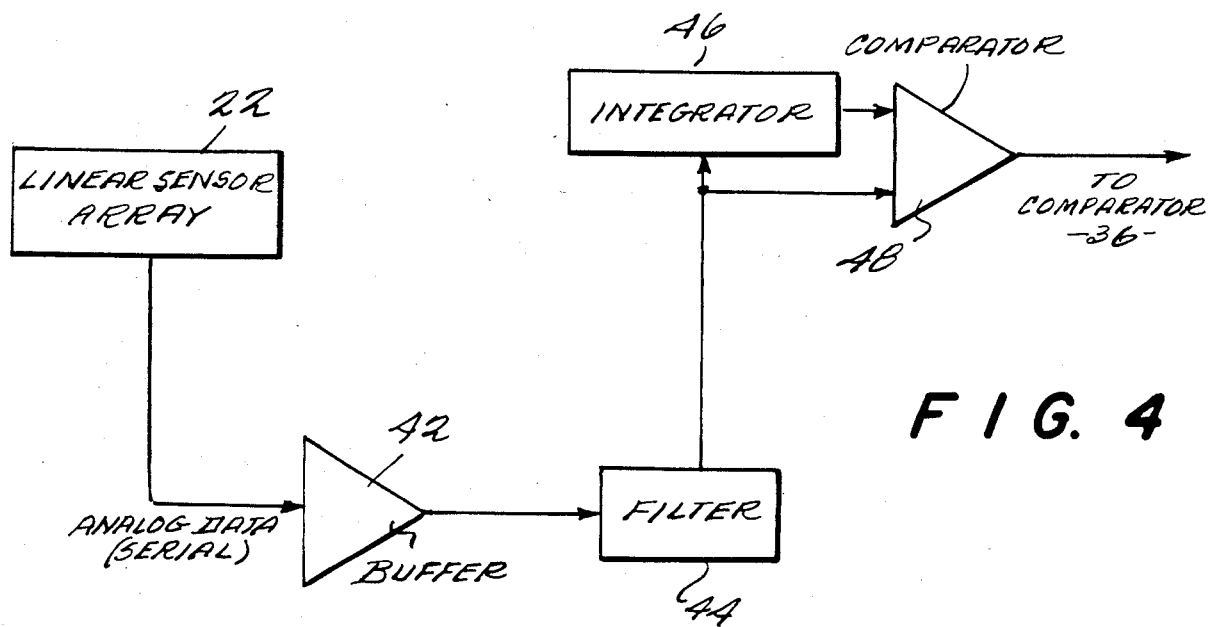
FIG. 4 is a detailed illustration of the automatic gain control circuit of the present invention.

FIG. 4 illustrates the details of the automatic gain control circuitry. Analog, serial data from linear sensor array 22 is transferred through buffer 42 to filter 44. When transferring data out of a typical CCD linear sensor array, a portion of the signal which clocks the array appears superposed with the output data. Filter 44 is intended to remove those vestiges of the clocking signal. The output of filter 44 is applied to both integrator 46 and comparator 48. The output of integrator 46 is applied to the other input of comparator 48.

Most of the analog data coming from linear sensor array 22 will represent the background adjacent to reticle 14. Integrator 46 will integrate up to this level. Data representing reticle 14 will have a different level from the background. Comparator 48 will determine the difference between the level caused by reticle 14 and the level being produced by integrator 46 and will produce an output signal when this difference is greater than a predetermined value. Thus, the automatic gain control circuit of the present invention as illustrated in FIG. 4 will produce an output pulse whenever data corresponding to the reticle image is received, independent of the sensitivity of the sensor array or the level of background illumination.

The preferred embodiment, described above, employs the present invention in the environment of an optical code recognition system for providing control signals to a text sensor so that the text sensor outputs data at appropriate intervals in the distance domain, rather than the time domain. Therefore, characters being sensed by the text sensor will have proportional widths, rendering easier the task of character recognition. However, the present invention has applications beyond the field of optical character recognition. Thus, the present invention may advantageously be employed in any system requiring the monitoring of the position of an element. Such applications include, but are not limited to, machine tool control, the monitoring of robot arms and the monitoring of radially moving heads associated with magnetic disks.

Thus, although only a single exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention as defined in the following claims.

What is claimed is:

1. Apparatus for controlling the acquisition of data in an optical character recognition system having a manually movable optical head for converting optical data to a plurality of electrical signals, said apparatus comprising:
   a manually positionable aligning means for guiding manual movement of said head along a series of characters on said medium;
   a reticle forming a sequence of optically differentiable portions extending on and along said aligning means in the direction of scanning at positions unrelated to the positions of said characters in the direction of scanning;
   means, attached to said head, for reading said characters and reticle; and
   means, responsive to said reading means, for causing said head to generate one of said electrical signals every time said head has moved a predetermined distance.

2. Apparatus as in claim 1 wherein:
   said reticle includes at least a portion transverse to the path of said head; and
   said reading means includes means for monitoring the position of points of said reticle normal to the path of said head.

3. Apparatus as in claim 2 wherein said transverse portion of said reticle includes a saw-toothed pattern.

4. Apparatus as in claim 3 wherein each portion of said saw-toothed pattern lies at an angle of 45° with respect to said path of said head.

5. Apparatus as in claim 2 wherein said reading means includes a linear sensor array disposed normal to said path of said head.

6. Apparatus as in claim 1 wherein said reading means includes means for converting an optical signal into an electrical reticle signal, an integrator responsive to said reticle signal and a comparator for comparing the output of said integrator and said reticle signal.

7. Apparatus as in claim 1 wherein said aligning means comprises:
   a track to be laid along said series of characters; and
   means, attached to said head, for following said track.

8. Apparatus as in claim 1 wherein said aligning means includes:
   a body for alignment with characters to be read;
   a rail attached to said body; and
   means defining a groove in said head for cooperating with said rail to guide said head.

9. Apparatus for controlling the acquisition of data in an optical character recognition system having a manually movable optical head for converting optical data to a plurality of electrical signals, said apparatus comprising:
   a manually positionable base for alignment with a row of characters to be read;
   a track attached to said base;
   a reticle disposed on said base and forming a sequence of optically differentiable portions unrelated in position along the direction of scanning to the positions of said characters in the direction of scanning;
   a linear sensor array, attached to said head, for monitoring the position of points of said reticle normal to said track;
   means defining a groove in said head for cooperating with said track;
   an integrator responsive to the output of said linear sensor array;
   a comparator having a first input responsive to the output of said linear sensor array and a second output responsive to the output of said integrator; and
   means, responsive to said comparator, for causing said head to generate one of said electrical signals every time said head has moved a predetermined distance.

10. Apparatus as in claim 9 wherein said reticle includes at least a portion lying at an angle of 45° with respect to said track.

11. Apparatus as in claim 10 wherein said causing means comprises:
    clock means for producing pulses in synchronism with data being output from said linear sensor array;
    a counter responsive to the output of said clock means;
    latch means for storing the output of said counter; and
    comparing means for comparing the output of said latch means and the output of said counter in response to an output signal from said comparator, and for producing an output when the difference between the output of said counter and the output of said latch means is greater than a predetermined value, the output of said comparing means causing said latch means to store the output of said counter.

12. A method for controlling the acquisition of data in an optical character recognition system having a manually movable head for scanning a line of said characters, said method comprising the steps of:

manually positioning a guide adjacent said line of characters so that optically differentiable portions of said reticle extend along said line adjacent thereto, the positions of said characters being unrelated to the positions of said portions along the direction of scanning;

scanning along a reticle to detect said characters as said head moves along said characters;

reading said reticle during said scanning; and causing, in response to said reading step, said head to output data every time said head has moved a predetermined distance.

13. A method as in claim 12 wherein:

said reticle includes at least a portion transverse to the direction of scanning;

said reading step includes the step of monitoring the position of points of said reticle normal to said direction of scanning; and said causing step includes the step of translating said normal position to a position of said head.

14. A method as in claim 13 wherein said monitoring step is performed by a linear sensor array disposed normal to said scanning direction.

15. A method as in claim 13 wherein said transverse portion lies at an angle of 45° with respect to said direction of scanning.

16. Apparatus for acquisition of optical data extending in a line comprising:

a head manually movable along the direction of scanning including an optical sensor for detecting optical data extending in a line along the direction of scanning;

manually positionable means for guiding manual scanning of said head along said line, said optical data including characters to be recognized extending on a medium along the direction of scanning and optically differentiable portions on said guiding means extending adjacent said characters along the direction of scanning, the positions of said characters and differentiable portions being unrelated along the direction of scanning; and means for processing the portion of said optical data on said medium in accordance with the portion of said optical data on said guiding means to produce data suitable for recognizing said characters.

17. An apparatus as in claim 16 wherein said processing means includes means for determining the speed of said head from the detected optically differentiable portions.

* * * * *